(12) United States Patent
Kikuchi et al.

(10) Patent No.: US 12,145,857 B2
(45) Date of Patent: Nov. 19, 2024

(54) METHOD FOR PRODUCING TUNGSTEN HEXAFLUORIDE

(71) Applicant: Central Glass Company, Limited, Ube (JP)

(72) Inventors: Akiou Kikuchi, Ube (JP); Yuta Takeda, Ube (JP); Masakiyo Nagatomo, Higashiomi (JP); Akifumi Yao, Ube (JP)

(73) Assignee: CENTRAL GLASS COMPANY, LIMITED, Ube (JP)

( * ) Notice: Subject to any disclaimer, the term of this patent is extended or adjusted under 35 U.S.C. 154(b) by 892 days.

(21) Appl. No.: 17/268,848

(22) PCT Filed: Jul. 12, 2019

(86) PCT No.: PCT/JP2019/027628
§ 371 (c)(1),
(2) Date: Feb. 16, 2021

(87) PCT Pub. No.: WO2020/036026
PCT Pub. Date: Feb. 20, 2020

(65) Prior Publication Data
US 2021/0253442 A1    Aug. 19, 2021

(30) Foreign Application Priority Data
Aug. 17, 2018   (JP) .................. 2018-153509

(51) Int. Cl.
*C01G 41/04*   (2006.01)
(52) U.S. Cl.
CPC .................. *C01G 41/04* (2013.01)

(58) Field of Classification Search
CPC .................. C01G 41/04; C01G 41/00
See application file for complete search history.

(56) References Cited

U.S. PATENT DOCUMENTS

2010/0104497 A1* 4/2010 Jang ............... B01J 8/1827
423/489
2015/0321254 A1  11/2015 Naito et al.
(Continued)

FOREIGN PATENT DOCUMENTS

CN       101070189 A    11/2007
CN       103526052 A     1/2014
(Continued)

OTHER PUBLICATIONS

Johnson et al. "WO3 and W Thermal Atomic Layer Etching Using "Conversion—Fluorination" and "Oxidation-Conversion-Fluorination" Mechanisms" ACS Appl. Mater. Interfaces 2017, 9, p. 34435-34447 (Year: 2017).*

(Continued)

*Primary Examiner* — Anthony J Zimmer
*Assistant Examiner* — Syed T Iqbal
(74) *Attorney, Agent, or Firm* — Crowell & Moring LLP

(57) ABSTRACT

A production method of tungsten hexafluoride according to one embodiment of the present invention includes: a first step of bringing tungsten having an oxide film into contact with a fluorine gas or inert gas containing 50 vol ppm to 50 vol % of hydrogen fluoride in a reactor, thereby removing the oxide film from the tungsten; and a second step of bringing the tungsten from which the oxide film has been removed by the first step into contact with a fluorine-containing gas to form tungsten hexafluoride.

20 Claims, 1 Drawing Sheet

(56) References Cited

U.S. PATENT DOCUMENTS

2017/0148670 A1   5/2017  Lei et al.
2020/0247685 A1   8/2020  Nagatomo et al.

FOREIGN PATENT DOCUMENTS

| CN | 106976913 A | 7/2017 |
|---|---|---|
| JP | 1-234301 A | 9/1989 |
| JP | 9-249975 A | 9/1997 |
| JP | 2000-119024 A | 4/2000 |
| JP | 2010-105910 A | 5/2010 |
| KR | 10-1376827 B1 | 3/2014 |
| WO | WO 2014/097698 A1 | 6/2014 |
| WO | WO 2019/044601 A1 | 3/2019 |
| WO | WO 2019/123771 A1 | 6/2019 |

OTHER PUBLICATIONS

Chinese-language Office Action issued in Chinese Application No. 201980052339.7 dated Jul. 12, 2022 (nine (9) pages).
International Search Report (PCT/ISA/210) issued in PCT Application No. PCT/JP2019/027628 dated Sep. 24, 2019 with English translation (five (5) pages).
Japanese-language Written Opinion (PCT/ISA/237) issued in PCT Application No. PCT/JP2019/027628 dated Sep. 24, 2019 (four (4) pages).

\* cited by examiner

METHOD FOR PRODUCING TUNGSTEN HEXAFLUORIDE

FIELD OF THE INVENTION

The present invention relates to a method for producing tungsten hexafluoride. It is known that tungsten hexafluoride is used as a semiconductor manufacturing gas for formation of metal wirings (circuits) on semiconductor substrates and the like.

BACKGROUND ART

Tungsten is a metal having a high melting point and low electric resistance, and is widely used in the form of a simple metal substance or a silicide thereof as a raw material for various electronic materials. In the field of electronic materials, particularly semiconductors, circuits are formed of tungsten on substrates by chemical vapor deposition (hereinafter also referred to as CVD) using tungsten hexafluoride (hereinafter also referred to as $WF_6$) as a raw material gas. In general, $WF_6$ is produced by reaction of a simple tungsten metal (hereinafter also simply referred to as tungsten) with a fluorine gas (hereinafter also referred to as $F_2$ gas).

For example, Patent Document 1 discloses a method of producing a gaseous metal fluoride by reaction of a simple metal substance with a fluorine gas, wherein the reaction is performed by admixing a solid metal fluoride that does not react with fluorine as a molding aid with the simple metal substance, press-molding the admixture and bringing the fluorine gas into contact with the molded body under heated conditions. In Patent Document 1, $WF_6$ is exemplified as the gaseous metal fluoride. It is described in TABLE 1 of Patent Document 1 that the reaction temperature for production of $WF_6$ is 250 to 500° C. It is further described that, in Examples of Patent Document 1, a $WF_6$ gas was formed by mixing a tungsten powder with a sodium fluoride powder at a mass ratio of 1:1, molding the mixed powder into a cylindrical column shape and bringing a fluorine gas into contact with the molded body under heated conditions of 380 to 400° C., and then, was collected by liquefaction with a cooling trap of −80° C.

Patent Document 2 discloses a method of producing high-purity $WF_6$ by providing a nitrogen trifluoride gas (hereinafter also referred to as $NF_3$ gas) with a water content of 1 vol ppm or less and bringing tungsten into contact with the $NF_3$ gas at 200 to 400° C. within a reactor. It is described in Patent Document 2 that, as a result of intensive studies made on the technique for stably purifying $WF_6$ to a high purity, it was found that the high-purity $WF_6$ can be obtained by reducing the water content of the $NF_3$ gas to the limit, with attention focused on the fact that a trace amount of water is contained in the $NF_3$ gas after washing treatment.

Patent Document 3 discloses a method of producing $WF_6$ from a tungsten powder and a $F_2$ gas with the use of a metal fluoride such as $CoF_3$ or $AgF_2$ as a catalyst. It is described in Patent Document 3 that the reaction temperature for production of $WF_6$ is 270 to 350° C.

Patent Document 4 discloses a method of producing $WF_6$ by contact reaction of tungsten with a fluorination agent, wherein the contact reaction is performed by charging a powder of tungsten in a closed reactor, injecting a pressurized inert gas into the reactor to cause fluidization of the tungsten powder, continuously feeding the fluorination agent in gaseous form into the reactor and thereby bringing the fluorination agent into contact with the tungsten powder in a fluidized state. It is described in Patent Document 4 that the contact reaction temperature is maintained at 230 to 300° C.

The standard heat ΔH of formation of $WF_6$ by the following reaction (1) between tungsten and $F_2$ is −1722 kJ/$WF_6$ mol (at 298 K and 1 atm), whereas the standard heat ΔH of formation of $WF_6$ by the following reaction (2) between tungsten and $NF_3$ is −1458 kJ/$WF_6$ mol (at 298 K and 1 atm).

$$W(s)+F_2(g) \rightarrow WF_6(g) \qquad \text{Reaction (1)}$$

$$W(s)+2NF_3(g) \rightarrow WF_6(g)+N_2(g) \qquad \text{Reaction (2)}$$

s=solid
g=gas

Each of the reactions (1) and (2) proceeds at a very fast reaction rate with a large heat of formation and thus causes a rapid increase of temperature in the reaction system during the process of production of $WF_6$. It is known that, when the temperature of the reaction system becomes high, an inner wall of the metallic reactor (hereinafter also simply referred to as reactor wall) gets damaged (corroded) by the fluorine-containing gas.

Originally, tungsten is a silvery-white metal having metallic luster. It is known that tungsten gradually loses luster as a surface of tungsten is oxidized (corroded) by oxygen or water in the air and thereby covered with a film of tungsten oxide. It is however also known that such oxidation occurs in a very thin surface region of tungsten and does not reach the inside of tungsten. In a high-humidity environment, tungsten is likely to have a natural oxide film (hereinafter also simply referred to as oxide film) formed of tungsten oxide on a surface thereof and thereby lose luster. As the tungsten oxide, there exist tungsten oxide ($W_2O_3$), tungsten dioxide ($WO_2$) and tungsten trioxide ($WO_3$).

Furthermore, Patent Document 5 discloses that a natural oxide film formed on a tungsten powder can be chemically removed by contact with an alkaline aqueous solution.

PRIOR ART DOCUMENTS

Patent Documents

Patent Document 1: Japanese Laid-Open Patent Publication No. JP H1-234301
Patent Document 2: Japanese Laid-Open Patent Publication No. 2000-119024
Patent Document 3: Chinese Patent Application Publication No. 106976913
Patent Document 4: Japanese Laid-Open Patent Publication No. 2010-105910
Patent Document 5: Re-publication of PCT International Publication No. 2014-097698

SUMMARY OF THE INVENTION

In the case where $WF_6$ is produced by contact of tungsten and $F_2$ according to any of the above conventional methods (Patent Documents 1 to 4), it is recommended to adopt a reaction temperature exceeding 200° C. However, the adoption of such a high reaction temperature raises a risk of thermal reaction runaway because the reaction of tungsten and $F_2$ for formation of $WF_6$ proceeds at a very fast reaction rate with a large heat of formation as mentioned above. In order to suppress this abnormal reaction and prevent the metallic reactor wall from being corroded by the fluorine-containing gas, it is necessary to utilize a cooling mechanism e.g. flow a coolant through a jacket of the reactor and thereby limit the temperature of the reactor wall to be 400° C. or lower during the reaction. In other words, the production of $WF_6$ requires heating at the initiation of the reaction and requires cooling to remove reaction heat during the reaction. The reactor is thus often provided with heating and cooling mechanisms. In the case where both of the heating and cooling mechanisms are provided, the operation of switching between heating and cooling during the reaction is complicated. When the timing of switching between heating and cooling is wrong, the temperature of the reactor wall may become excessively high so that the reactor gets damaged as mentioned above.

It is an object of the present invention to provide a $WF_6$ production method capable of solving the above problems and producing $WF_6$ at a lower temperature than the conventional methods. It is also an object of the present invention to provide a $WF_6$ production method capable of producing $WF_6$ at a lower temperature that does not cause a damage to reaction equipment and to provide an oxide film removing method capable of removing an oxide film on tungsten at a low temperature.

As a result of intensive studies made by the present inventors to solve the above problems, it has been found that: when raw material tungsten having an oxide film is subjected to pretreatment by contact with a $F_2$ gas containing hydrogen fluoride (hereinafter also referred to as HF) at a concentration of 50 vol ppm (parts per million by volume) or more or a $N_2$ gas containing HF at a concentration of 50 vol ppm (parts per million by volume) or more, the oxide film on the surface of the raw material tungsten is surprisingly removed; and, after the pretreatment, the resulting tungsten immediately reacts with a $F_2$ gas at a low temperature of 200° C. or lower to form $WF_6$. The present invention has been developed based on this finding (see the aftermentioned Examples of TABLE 1).

Accordingly, the present invention includes the following aspects 1 to 6.

Aspect 1

A production method of tungsten hexafluoride, comprising:
a first step of bringing tungsten having an oxide surface into contact with a fluorine gas or inert gas containing 50 vol ppm to 50 vol % of hydrogen fluoride in a reactor, thereby removing the oxide film from the tungsten; and
a second step of bringing the tungsten from which the oxide film has been removed by the first step into contact with a fluorine-containing gas in a reactor to form tungsten hexafluoride.

Aspect 2

The production method of tungsten hexafluoride according to Aspect 1, wherein, in the first step, the tungsten having the oxide film is brought into contact with the fluorine gas or inert gas containing 50 vol ppm to 50 vol % of hydrogen fluoride at a temperature ranging from 25° C. to 200° C.

Aspect 3

The production method of tungsten hexafluoride according to Aspect 1 or 2, wherein the fluorine-containing gas used in the second step is a fluorine gas, a nitrogen trifluoride gas or a mixed gas thereof.

Aspect 4

The production method of tungsten hexafluoride according to any one of Aspects 1 to 3, wherein, in the second step, the tungsten from which the oxide film has been removed is brought into contact with the fluorine-containing gas at a temperature ranging from 25° C. to 200° C.

Aspect 5

An oxide film removing method for tungsten, comprising: bringing tungsten having an oxide film into contact with a fluorine gas or inert gas containing 50 vol ppm to 50 vol % of hydrogen fluoride.

Aspect 6

The oxide film removing method for tungsten according to Aspect 5, wherein the tungsten having the oxide film is brought into contact with the fluorine gas or inert gas containing 50 vol ppm to 0 vol % of hydrogen fluoride at a temperature ranging from 25° C. to 200° C.

DETAILED DESCRIPTION OF THE EMBODIMENTS

Figure 1:
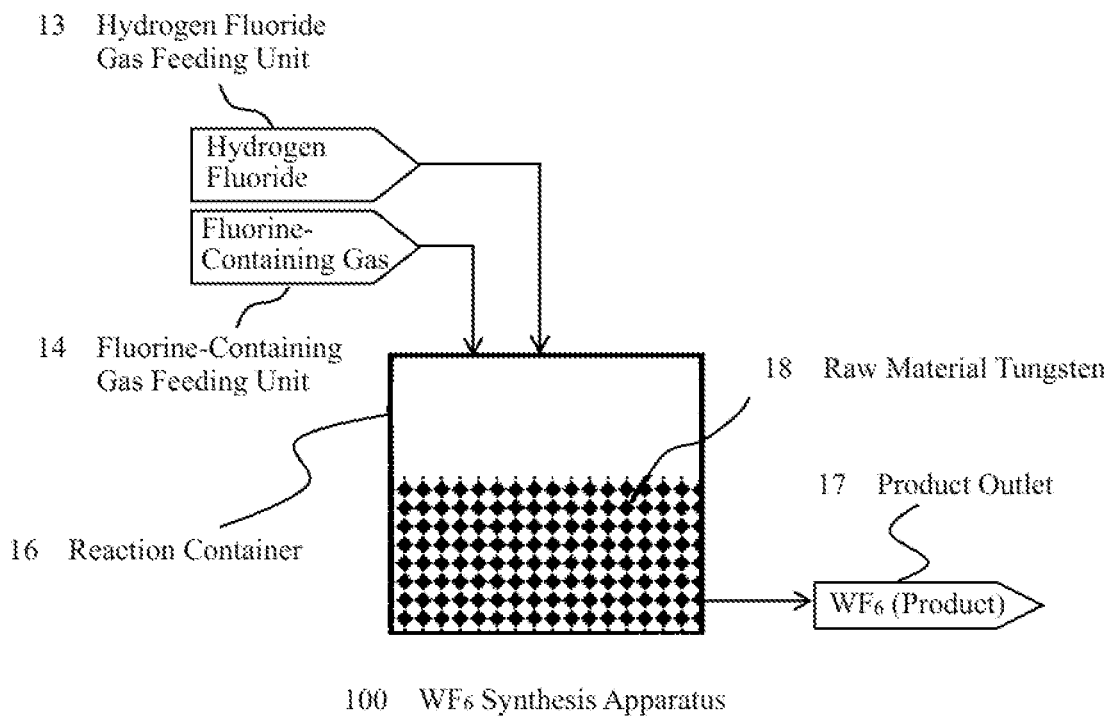
FIG. 1 is a schematic view of a $WF_6$ synthesis apparatus.

Embodiments of the present invention will be described in detail below. It should however be noted that the present invention is not limited to the following embodiments.

A $WF_6$ production method according to the first embodiment of the present invention includes: a first step (hereinafter also referred to as pretreatment step) of bringing tungsten having an oxide film into contact with a $F_2$ gas or inert gas containing 50 vol ppm to 50 vol % of HF in a reactor, thereby removing the oxide film from the tungsten; and a second step of forming $WF_6$ by bringing the tungsten from which the oxide film has been removed by the first step into contact with a fluorine-containing gas.

Herein, the first step corresponds to an oxide film removing method for tungsten according to the second embodiment of the present invention as will be mentioned later.

1. Raw Material Tungsten

Metal tungsten as a raw material for production of tungsten hexafluoride (hereinafter also referred to as raw material tungsten) is commercially available in the form of an ingot or in the form of being processed into a powder. Since the outermost surface of a tungsten powder is thinly oxidized in the air, a commercially available tungsten powder loses its luster and turns brown due to the formation of a natural oxide film. In the tungsten hexafluoride production method, the raw material tungsten can be also called "tungsten having an oxide film".

In the tungsten hexafluoride production method, the raw material tungsten can be used in various forms such as a powder, a bulk, an ingot etc. Although the raw material tungsten used in the tungsten hexafluoride production method can be selected from various forms such as a powder with a particle size of 100 nm or smaller, an ingot with a size of 10 cm or larger etc., it is preferable to use the raw material tungsten in the form of a powder with a particle size of 1 μm to 10 cm or a bulk for ease of charging the raw material tungsten into the reactor and for ease of flowing the $F_2$ gas or inert gas through the tungsten powder or bulk. Tungsten powders with various particle sizes ranging from 0.5 μm to 1500 μm are commercially available. It is also preferable to arbitrarily select the raw material tungsten from these commercially available powders. In the present invention, the particle size of the tungsten powder refers to an average particle diameter measured according to the Fisher Subsieve Sizer method.

Even in the oxide film removing method for tungsten, the above-mentioned raw material tungsten can be arbitrarily selected and used.

2. First Step (Pretreatment Step)

In the first step of the $WF_6$ production method, the tungsten having the oxide film (i.e. raw material tungsten) is brought into contact with the $F_2$ gas or inert gas containing 50 vol ppm to 50 vol % of HF (hereinafter also referred to as "HF-containing gas") in the reactor whereby there is obtained the tungsten from which the oxide film has been removed. Examples of the inert gas are nitrogen ($N_2$), helium (He) and argon (Ar). In terms of easy availability and cost, $N_2$ is preferred as the inert gas.

As mentioned above, it is known that an oxide film is formed a surface of tungsten is corroded in the air even under normal temperature and normal humidity conditions so that an oxide film is formed to cover the outermost surface of the tungsten. The tungsten whose outermost surface is covered with the oxide film is poor in reactivity with $F_2$. For production of $WF_6$, such tungsten has to be reacted with a $F_2$ gas under high-temperature conditions exceeding 200° C. as disclosed in Patent Documents 1 to 4.

As a result of intensive studies made by the present inventors, however, it has surprisingly been found that: when the pretreatment step (first step) is performed by bringing a $F_2$ gas or inert gas containing HF at a concentration of 50 vol ppm (parts per million by volume) to 50 vol % into contact with raw material tungsten, the surface of the raw material tungsten is activated by removal of an oxide film without the need to separately perform alkaline treatment as disclosed in Patent Document 5; and the resulting tungsten immediately reacts with a $F_2$ gas even at a low temperature of 150° C. or lower to immediately form $WF_6$ (see Examples 1 to 5 of TABLE 1). As will be discussed later, raw material tungsten was not subjected to any alkaline treatment for removal of an oxide film in each of the after-mentioned Examples. It is assumed that: by the pretreatment before the formation of $WF_6$ being performed with the $F_2$ gas or inert gas containing a low concentration of HF, it is possible to remove the oxide film on the outermost surface of the tungsten without causing corrosion of the reactor wall by HF; and, by removal of the oxide film from the surface of the tungsten, the surface of the tungsten is activated to immediately react with $F_2$ so that $WF_6$ can be immediately formed at a lower temperature.

In the tungsten hexafluoride production method according to the present embodiment, $WOF_4$ or $WF_6$ is detected in the reaction system after the first step in which the raw material tungsten and the HF-containing gas are brought into contact with each other. Hence, the following reactions are assumed as the mechanism of removing the oxide film from the raw material tungsten upon contact of the raw material tungsten with the HF-containing gas.

For example, tungsten trifluoride ($WO_3$) reacts with HF whereby $WOF_4$ is formed from $WO_3$ through the following reactions (3) to (6).

$$HF+WO_3 \rightarrow WO_2F(OH) \quad \text{Reaction(3)}$$

$$HF+WO_2F(OH) \rightarrow WOF_2(OH)_2 \quad \text{Reaction(4)}$$

$$HF+WOF_2(OH)_2 \rightarrow WF_3(OH)_3 \quad \text{Reaction(5)}$$

$$HF+WF_3(OH)_3 \rightarrow WOF_4+2H_2O \quad \text{Reaction(6)}$$

In the presence of a $F_2$ gas, $WF_3(OH)_3$ formed in the reaction (5) reacts with the $F_2$ gas whereby $WF_6$ is formed from $WO_3$ through the following reaction (7).

$$WF_3(OH)_3+F_2 \rightarrow WF_6+3HF+3/2O_2 \quad \text{Reaction(7)}$$

$WOF_4$ formed in the reaction (6) and $WF_6$ formed in the reaction (7) are vaporized and remain in the reaction system. In this way, the oxide film on the tungsten surface is converted to a gas ($WOF_4$ or $WF_6$) and removed.

In the $WF_6$ production method according to the present embodiment, the concentration of HF in the $F_2$ gas or inert gas during the first step is 50 vol ppm to 50 vol % as expressed in parts per million by volume or percentage by volume based on the total volume of the $F_2$ gas and HF or the total volume of the inert gas and HF. When the concentration of HF in the gas is lower than 50 vol ppm, the effect of removing the oxide film from the surface of the raw material tungsten is small. When the concentration of HF in the gas is higher than 50 vol %, there is a risk of corrosion of the reactor wall by HF. The concentration of HF in the gas is preferably 100 vol ppm to 1 vol % (10000 vol ppm).

[Contact Temperature]

In the $WF_6$ production method according to the present embodiment, the contact temperature between the raw material tungsten and the HF-containing gas during the first step is preferably 25° C. to 200° C. Even when the contact temperature is room temperature (25° C.), the surface of the raw material tungsten is sufficiently activated by removal of the oxide film. The contact temperature is more preferably higher than or equal to 40° C. Since one object of the $WF_6$ production method according to the present invention is to produce $WF_6$ without using a reaction temperature exceeding 200° C. so as not to cause a damage to the reactor, more specifically the reactor wall, the contact temperature between the tungsten and the HF-containing gas does not need to be higher than 200° C. The contact temperature is more preferably lower than or equal to 150° C., still more preferably lower than or equal to 70° C.

[Contact Time]

In the $WF_6$ production method according to the present embodiment, the contact time between the raw material tungsten and the HF-containing gas during the first step can be arbitrarily set depending on, for example, the degree of progress of oxidation of the raw material tungsten, the yield of $WF_6$ after the second step, and the like.

[Contact Pressure]

In the $WF_6$ production method according to the present embodiment, the pressure inside the reactor during the first step is preferably 0.01 kPa to 300 kPa, more preferably 0.01 kPa to 100 kPa, in terms of absolute pressure. It is unfavorable that the pressure inside the reactor is lower than 0.01 kPa in terms of absolute pressure because, in such a low pressure range, the load of pressure retaining equipment becomes large. It is also unfavorable that the pressure inside the reactor is higher than 300 kPa in terms of absolute pressure because, in such a high pressure range, there arise a possibility of liquefaction of $WF_6$ and a possibility of leakage of $WF_6$ from the reactor.

3. Second Step (Reaction Step)

In the second step, the tungsten from which the oxide film has been removed by the first step is brought into contact with the fluorine-containing gas such as $F_2$ gas to form $WF_6$.

[Fluorine-Containing Gas]

Examples of the fluorine-containing gas used in the second step are a $F_2$ gas, a $NF_3$ gas and a mixed gas thereof. The fluorine-containing gas may be diluted with an inert gas. In this case, the inert gas is selected from the group consisting of $N_2$, He and Ar. As the fluorine-containing gas, a $F_2$ gas is preferred.

[Reaction]

In the case of using a $F_2$ gas as the fluorine-containing gas, the tungsten after the first step (i.e. the tungsten from which the oxide film has been removed) reacts with the $F_2$ gas to form $WF_6$ as in the above reaction (1). In the case of using a $NF_3$ gas as the fluorine-containing gas, the tungsten after the first step (i.e. the tungsten from which the oxide film has been removed) reacts with the $NF_3$ gas to form $WF_6$ as in the above reaction (2).

[Contact Temperature]

The contact temperature between the tungsten from which the oxide film has been removed and the fluorine-containing gas during the second step is preferably 25° C. to 200° C. Even when the contact temperature is room temperature (25° C.), the tungsten from which the oxide film has been removed reacts with the fluorine-containing gas. The contact pressure is more preferably higher than or equal to 40° C. Since one object of the $WF_6$ production method according to the present invention is to produce $WF_6$ at a low temperature of 200° C. or lower, the contact temperature between the tungsten from which the oxide film has been removed and the fluorine-containing gas does not need to be higher than 200° C. The contact temperature is more preferably lower than or equal to 150° C., still more preferably lower than or equal to 70° C.

[Contact Time]

The contact time between the tungsten from which the oxide film has been removed and the fluorine-containing gas during the second step can be arbitrarily set depending on, for example, the yield of $WF_6$ and the like.

[Contact Pressure]

In the $WF_6$ production method according to the present embodiment, the pressure inside the reactor during the second step is in the same range as the pressure inside the reactor during the first step.

4. Production of $WF_6$

[Reactor]

The reactor used in the $WF_6$ production method according to the present embodiment can be of batch type or continuous type as long as the reactor is capable of being charged with the tungsten. The material of the reactor is selected from those resistant to $F_2$, $WF_6$ and HF. For instance, nickel, nickel alloy and stainless steel are usable as the reactor material. Specific examples of the nickel alloy are Monel (trademark) predominantly containing nickel and copper with small amounts of iron, manganese, sulfur etc. Specific examples of the stainless steel are austenite stainless steels such as SUS304, SUS316 etc.

In the $WF_6$ production method, it is preferable to utilize a circulation system for flowing the gas through the tungsten in order to improve the contact efficiency between the HF-containing gas and the raw material tungsten during the first step and the contact efficiency between the tungsten and the fluorine-containing gas such as $F_2$ gas during the second step. In the first step, however, the oxide film can be removed from the tungsten even without the use of the circulation system.

[Shift from First Step to Second Step]

Herein, an explanation will be given of the shift from the "first step (pretreatment step)" to the "second step (reaction step)" in the $WF_6$ production method according to the present embodiment.

It is convenient and economical to perform the first step and the second step continuously in the same reactor although the first step and the second step can be performed in different reactors. At the time of shifting from the first step to the second step, it is preferable to remove the gas after the first step from the reactor in the case where the concentration of HF in the gas after the first step is high. In the case where the concentration of HF in the gas after the first step is low or in the case where HF has been completely consumed by the first step and thus does not remain in the system, the second step can be initiated by feeding the fluorine-containing gas such as $F_2$ gas into the reactor without removing the gas after the first step.

It is preferable and convenient to perform the first step in a state that the reactor is closed after being charged with the raw material tungsten and the HF-containing gas. In order to activate the surface of the raw material tungsten by removal of the oxide film, it is preferable to circulate and flow the gas in the reactor.

Further, it is convenient to perform the second step by feeding the fluorine-containing gas such as $F_2$ gas to allow the fed gas to flow through the tungsten charged in the reactor and come into contact the tungsten, and then, collecting the gas after the contact.

The concentration of $WF_6$ product in the gas after the contact can be measured by analyzing the collected gas with a Fourier transform infrared spectrophotometer.

[$WF_6$ Synthesis Apparatus]

One example of $WF_6$ synthesis apparatus usable in the $WF_6$ production method according to the present embodiment is shown in FIG. 1. It is noted that the $WF_6$ synthesis apparatus used in the $WF_6$ production method according to the present embodiment is not limited to that of FIG. 1.

As shown in FIG. 1, the $WF_6$ synthesis apparatus 100 includes: a reaction container (as a reactor) 16 charged with raw material tungsten 18; a hydrogen fluoride gas (HF) feeding unit 13; a fluorine-containing gas feeding unit 14; and an inert gas (e.g. $N_2$) feeding unit (not shown).

The reaction container 16 is equipped with a jacket or electric heater (not shown) so as to adjust the temperature inside the reaction container 16 by the flow of temperature-controlled water through the jacket or to heat the inside of the reaction container 16 by the heater.

Each of the HF gas feeding unit 13 and the fluorine-containing gas feeding unit 14 is equipped with a mass flow controller (not shown) and is configured to feed the gas into the reaction container 16 while controlling the flow rate of the gas by the mass flow controller. A product outlet 17 is disposed on a downstream side of the reaction container 16 so that the gas after the reaction is taken out from the product outlet.

The reaction container 16 may be provided with a circulation system so as to circulate the $F_2$ gas or inert gas containing HF, or the fluorine-containing gas such as $F_2$ gas, and allow the gas to flow through the tungsten.

5. Oxide Film Removal Method for Tungsten

The oxide film removal method for tungsten according to the second embodiment of the present invention includes bringing tungsten having an oxide film into contact with a $F_2$ gas or inert gas containing 50 vol ppm to 50 vol % of HF.

As mentioned above, it is known that a surface of tungsten is oxidized (corroded) in the air even under normal temperature and normal humidity conditions so that an oxide film is formed to cover the outermost surface of the tungsten. The present inventors have found as a result of intensive studies that, when the pretreatment step (first step) is performed by bringing the $F_2$ gas or inert gas containing 50 vol ppm to 50 vol % of HF into contact with the tungsten having the oxide film, the oxide film is removed from the surface of tungsten; and the thus-treated tungsten surface becomes reactive to $F_2$ so that the tungsten immediately reacts with a $F_2$ gas even at a low temperature of 150° C. or lower to immediately form WF6 (see Examples 1 to 4 of TABLE 1). In other words, it is possible to remove the oxide film on the outermost surface of the tungsten under a mild condition that the contact temperature is 150° C. or lower.

In the oxide film removal method for tungsten according to the present embodiment, the concentration of HF in the $F_2$ gas or inert gas is 50 vol ppm to 50 Vol % as expressed in parts per million by volume or percentage by volume based on the total volume of the $F_2$ gas or inert gas and HF. When the concentration of HF is lower than 50 vol ppm, the effect of removing the oxide film from the surface of tungsten is small. When the concentration of HF is higher than 50 Vol %, there is a risk of corrosion of the reactor under the strong oxidation power of HF. The concentration of HF is preferably 100 vol ppm to 1 vol %.

[Contact Temperature]

In the oxide film removal method for tungsten according to the present embodiment, the contact temperature between the tungsten and the HF-containing gas is preferably 25° C. to 200° C. Even when the contact temperature is room temperature (25° C.), the surface of the tungsten is sufficiently activated by removal of the oxide film from the tungsten surface. The contact temperature is more preferably higher than or equal to 40° C. When the contact temperature is higher than 200° C., there arises a possibility of a damage caused to the reactor. The contact temperature is more preferably lower than or equal to 150° C.

[Reactor]

The reactor can be of batch type or continuous type as long as the reactor is capable of being charged with the tungsten. The material of the reactor is selected from those resistant to $F_2$, $WF_6$ and HF. For instance, nickel, nickel alloy and stainless steel are usable as the reactor material. Specific examples of the nickel alloy are Monel (trademark) predominantly containing nickel and copper with small amounts of iron, manganese, sulfur etc. Specific examples of the stainless steel are austenite stainless steels such as SUS304, SUS316 etc.

EXAMPLES

The production method of tungsten hexafluoride according to the present invention will be described in more detail below by way of the following specific examples. It should however be understood that the production method of tungsten hexafluoride according to the present invention is not limited to the following specific examples.

[$WF_6$ Synthesis Apparatus]

In the following examples, the production of $WF_6$ was carried out using the $WF_6$ synthesis apparatus of FIG. 1. The reaction container 16 used was a batch-type reaction container made of Ni with an inner diameter of 55 mm, an outer diameter of 60 mm and a length of 300 mm. The temperature inside the reaction container 16 was adjusted by flowing temperature-controlled water at a flow rate of 0.5 L/min through the jacket of the reaction container 16.

[$WF_6$ Concentration Measurement]

The concentration of $WF_6$ in the gas taken out from the product outlet 17 was measured with a Fourier transform infrared spectrophotometer (type IRPrestage21 manufactured by Shimadzu Corporation).

Example 1

[First Step (Pretreatment Step)]

Figure 2:
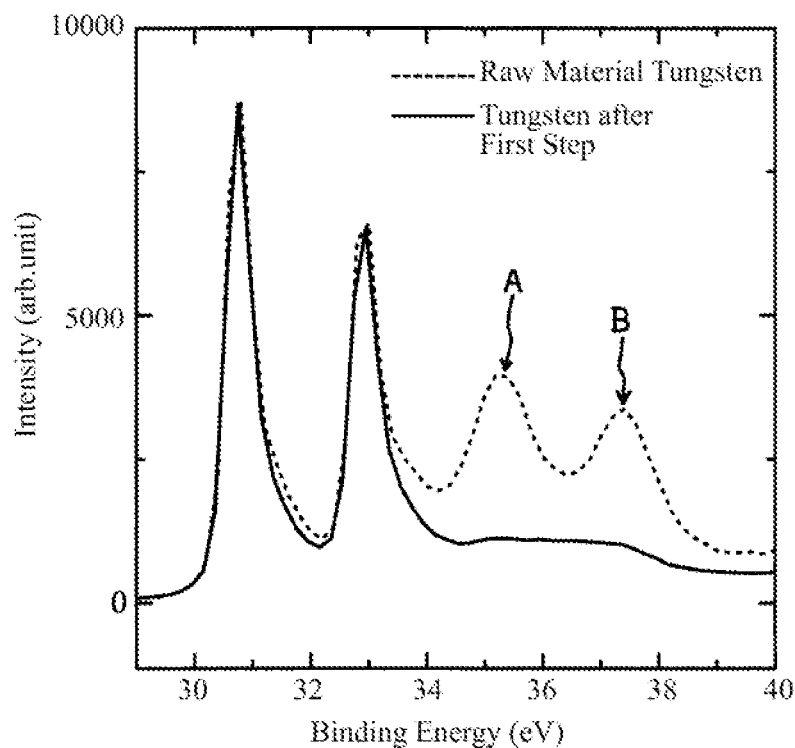
FIG. 2 is a graph showing X-ray photoelectron spectra of raw material tungsten and tungsten material after a first step (pretreatment step).

Into the reaction container 16, commercially available raw material tungsten 18 (605.5 g, particle size: 1 μm) was charged. The inside of the reaction container 16 was degassed, and then, heated to 70° C. by flowing hot water through the jacket (not shown). In a state that the inside of the reaction container 16 was maintained at 70° C., a HF gas and a $F_2$ gas were respectively fed from the HF gas feeding unit 13 and the fluorine-containing gas feeding unit 14 into the reaction container such that the concentration of HF relative to the $F_2$ gas was controlled to 100 vol ppm (0.01 vol %) and such that the pressure inside the reaction container 16 was controlled to 80 kPa. After the gas feeding, the gas inside the reaction container 16 was kept circulated by the circulation system for 24 hours so as to flow through the raw material tungsten 18 in a state that the inside of the reaction container 16 was maintained at 70° C. After the gas inside the reaction container 16 was discharged and replaced with an inert gas ($N_2$), a part of the tungsten inside the reaction container 16 was taken out and analyzed by XPS (X-ray Photoelectron Spectroscopy). The XPS analysis result is shown in FIG. 2. In the spectrum of the raw material tungsten, there were peaks A and B corresponding to W—O bond. On the other hand, the peaks A and B corresponding to W—O bond disappeared in the spectrum of the tungsten after the first step. It is confirmed from this result that the oxide film was removed from the tungsten.

[Second Step (Reaction Step)]

In a state that the inside of the reaction container 16 was maintained at 70° C., a $F_2$ gas was fed from the fluorine-containing gas feeding unit 14 into the reaction container 16 at a flow rate of 0.5 slm (liter per minute at 0° C. and 1 atm) by the mass flow controller (not shown) such that only the $F_2$ gas flowed through the tungsten 18 from which the oxide film had been removed in the reaction container 16 under a condition that the pressure inside the reaction container was 80 kPa. After a lapse of 20 minutes from the initiation of the gas flow, a part of the reaction product gas was taken out and sampled from the product outlet 17. When the sampled product gas was analyzed with the Fourier transform infrared spectrophotometer, it was confirmed that $WF_6$ was contained at a concentration of 99% or more in the product gas.

Example 2

The first step and the second step were performed by the same procedures under the same conditions using the same raw material tungsten 18 as in Example 1, except that the concentration of HF in the $F_2$ gas charged into the reaction container 16 was controlled to 1000 vol ppm (0.1 vol %). After a lapse of 20 minutes from the initiation of the gas flow in the second step, a part of the reaction product gas was taken out and sampled from the product outlet 17. When the sampled product gas was analyzed with the Fourier transform infrared spectrophotometer, it was confirmed that $WF_6$ was contained at a concentration of 99% or more in the product gas.

Example 3

The first step and the second step were performed by the same procedures under the same conditions using the same raw material tungsten 18 as in Example 1, except that the concentration of HF in the $F_2$ gas charged into the reaction container 16 was controlled to 10000 vol ppm (1 vol %). After a lapse of 20 minutes from the initiation of the gas flow in the second step, a part of the reaction product gas was taken out and sampled from the product outlet 17. When the sampled product gas was analyzed with the Fourier transform infrared spectrophotometer, it was confirmed that $WF_6$ was contained at a concentration of 99% or more in the product gas.

Example 4

[First Step (Pretreatment Step)]

Into the reaction container 16, the same raw material tungsten 18 as used in Example 1 was charged. The inside of the reaction container 16 was degassed, and then, heated to 40° C. by flowing hot water through the jacket (not shown). In a state that the inside of the reaction container 16 was maintained at 40° C., a HF gas and a $F_2$ gas were respectively fed from the HF gas feeding unit 13 and the fluorine-containing gas feeding unit 14 into the reaction container such that the concentration of HF relative to the $F_2$ gas was controlled to 100 vol ppm (0.01 vol %) and such that the pressure inside the reaction container 16 was controlled to 80 kPa. After the gas feeding, the gas inside the reaction container 16 was kept circulated for 24 hours so as to flow through the raw material tungsten 18 in a state that the inside of the reaction container 16 was maintained at 40° C.

[Second Step (Reaction Step)]

In a state that the inside of the reaction container 16 was maintained at 40° C., a $F_2$ gas was fed from the fluorine-containing gas feeding unit 14 into the reaction container 16 at a flow rate of 0.5 slm by the mass flow controller (not shown) such that only the $F_2$ gas flowed through the tungsten 18 from which the oxide film had been removed in the reaction container 16 under a condition that the pressure inside the reaction container was 80 kPa. After a lapse of 20 minutes from the initiation of the gas flow, a part of the reaction product gas was taken out and sampled from the product outlet 17. When the sampled product gas was analyzed with the Fourier transform infrared spectrophotometer, it was confirmed that $WF_6$ was contained at a concentration of 99% or more in the product gas.

Example 5

[First Step (Pretreatment Step)]

Into the reaction container 16, the same raw material tungsten as used in Example 1 was charged. The inside of the reaction container 16 was degassed, and then, heated to 40° C. by flowing hot water through the jacket (not shown). In a state that the inside of the reaction container 16 was maintained at 40° C., a HF gas and a $N_2$ gas were respectively fed from the HF gas feeding unit 13 and the $N_2$ gas feeding unit (not shown) into the reaction container such that the concentration of HF relative to the $N_2$ gas was controlled to 100 vol ppm (0.01 vol %) and such that the pressure inside the reaction container 16 was controlled to 80 kPa. After the gas feeding, the gas inside the reaction container 16 was kept circulated for 24 hours so as to flow through the raw material tungsten 18 in a state that the inside of the reaction container 16 was maintained at 40° C.

[Second Step (Reaction Step)]

In a state that the inside of the reaction container 16 was maintained at 40° C., a $F_2$ gas was fed from the fluorine-containing gas feeding unit 14 into the reaction container 16 at a flow rate of 0.5 slm by the mass flow controller (not shown) such that only the $F_2$ gas flowed through the tungsten 18 from which the oxide film had been removed in the reaction container 16 under a condition that the pressure inside the reaction container was 80 kPa. After a lapse of 20 minutes from the initiation of the gas flow, a part of the reaction product gas was taken out and sampled from the product outlet 17. When the sampled product gas was analyzed with the Fourier transform infrared spectrophotometer, it was confirmed that $WF_6$ was contained at a concentration of 99% or more in the product gas.

Comparative Example 1

The first step and the second step were performed by the same procedures under the same conditions using the same raw material tungsten 18 as in Example 1, except that the concentration of HF in the $F_2$ gas charged into the reaction container 16 was controlled to 10 vol ppm (0.001 vol %). Apart of the reaction product gas was taken out and sampled from the product outlet 17. When the sampled product gas was analyzed with the Fourier transform infrared spectrophotometer, it was confirmed that $WF_6$ was contained at a concentration of 5% in the product gas.

Comparative Example 2

Without performing the first step, the second step was performed by the same procedure under the same conditions using the same raw material tungsten 18 as in Example 1.

More specifically, 605.5 g of the raw material tungsten 18 was charged into the reaction container 16. Then, the inside of the reaction container 16 was degassed. In a state that the inside of the reaction container 16 was maintained at 70° C. by flowing water of 70° C. through the jacket, a $F_2$ gas was fed from the fluorine-containing gas feeding unit 14 into the reaction container 16 at a flow rate of 0.5 slm by the mass flow controller (not shown) such that only the $F_2$ gas flowed through the raw material tungsten 18 in the reaction container 16 under a condition that the pressure inside the reaction container was 80 kPa. After a lapse of 20 minutes from the initiation of the gas flow, a part of the reaction product gas was taken out and sampled from the product outlet 17. When the sampled product gas was analyzed with the Fourier transform infrared spectrophotometer, it was confirmed that $WF_6$ was contained at a concentration of 3% in the product gas.

Reference Example 1

Using the same raw material tungsten as in Example 1, $WF_6$ was produced without performing the first step.

More specifically, a $F_2$ gas was fed from the fluorine-containing gas feeding unit 14 into the reaction container 16 at a flow rate of 0.5 slm (liter per minute at 0° C. and 1 atm) by the mass flow controller (not shown) in a state that the inside of the reaction container 16 was heated to 250° C. by the electric heater. By this gas feeding, only the $F_2$ gas flowed through the reaction container 16 under a condition that the pressure inside the reaction container 16 was 80 kPa. After a lapse of 20 minutes from the initiation of the gas flow, a part of the reaction product gas was taken out and sampled from the product outlet 17. When the sampled product gas was analyzed with the Fourier transform infrared spectrophotometer, it was confirmed that $WF_6$ was contained at a concentration of 99% or more in the product gas.

In TABLE 1, Examples 1 to 4 and Comparative Examples 1 to 2 are summarized by showing are the contact temperature between the raw material tungsten 18 and the HF-containing $F_2$ gas and the concentration of HF in the $F_2$ gas during the first step, the contact temperature between the tungsten from which the oxide film was removed and the $F_2$ gas during the second step and the concentration of $WF_6$ in the product gas at the product outlet 17.

TABLE 1

| | First Step (Pretreatment Step) | | | Second Step (Reaction Step) | |
|---|---|---|---|---|---|
| | HF | | | | |
| | Contact Temp. °C. | Conc. vol ppm | HF Diluting Gas | Contact Temp. °C. | $WF_6$ Conc. % |
| Example 1 | 70 | 100 | $F_2$ | 70 | >99 |
| Example 2 | 70 | 1000 | | 70 | >99 |
| Example 3 | 70 | 10000 | | 70 | >99 |
| Example 4 | 40 | 500 | | 40 | >99 |
| Example 5 | 40 | 500 | $N_2$ | 40 | >99 |
| Comparative Example 1 | 70 | 10 | $F_2$ | 70 | 5 |
| Comparative Example 2 | No Treatment | | | 70 | 3 |
| Reference Example 1 | | | | 250 | >99 |

In each of Examples 1 to 4 embodying the $WF_6$ production method according to the present invention, $WF_6$ was finally obtained at a high concentration of 99% or more even though the contact temperature during the second step was 40° C. or 70° C. which was lower than those in the conventional methods.

In Comparative Example 1 in which the concentration of HF in the $F_2$ gas was low and was out of the scope of the $WF_6$ production method according to the present invention, the concentration of $WF_6$ was at a low level of 5%. In Comparative Example 2 in which the first step of the $WF_6$ production method according to the present invention was not performed, the concentration of $WF_6$ was at a low level of 3%.

In Reference Example 1 corresponding to one conventional method, $WF_6$ was finally obtained at a high concentration of 99% or higher. However, the contact temperature between the tungsten and the $F_2$ gas was 250° C. in Reference Example 1.

As described above, the production method of $WF_6$ according to the embodiment of the present invention enables production of $WF_6$ by contact of the tungsten and the fluorine-containing gas at a lower temperature than the conventional methods. Further, the production method of $WF_6$ and the oxide film removing method for tungsten both according to the embodiments of the present invention enable activation of the tungsten by removal of the oxide film from the surface of the tungsten so as to allow immediate reaction of the tungsten with $F_2$ such that $WF_6$ can be obtained, without causing a damage to the reactor, by contact of the tungsten and the fluorine-containing gas at a lower temperature than the conventional methods of production of $WF_6$.

DESCRIPTION OF REFERENCE NUMERALS

100: $WF_6$ synthesis apparatus
13: Hydrogen fluoride gas feeding unit (HF gas feeding unit)
14: Fluorine-containing gas feeding unit
16: Reaction vessel (Reactor)
17: Product outlet
18: Raw material tungsten

The invention claimed is:

1. A production method of tungsten hexafluoride, comprising:
   a first step of bringing a first amount of tungsten having an oxide film into contact with a hydrogen fluoride-containing fluorine gas in a reactor, thereby removing the oxide film from the first amount of tungsten and forming a first amount of tungsten hexafluoride and a second amount of tungsten from which the oxide film has been removed, wherein the hydrogen fluoride-containing fluorine gas is a fluorine gas containing from 50 vol ppm to 50 vol % of hydrogen fluoride; and
   a second step of bringing the second amount of tungsten from which the oxide film has been removed by the first step into contact with a fluorine-containing gas to form a second amount of tungsten hexafluoride.

2. The production method of tungsten hexafluoride according to claim 1, wherein, in the first step, the first amount of tungsten having the oxide film is brought into contact with the hydrogen fluoride-containing fluorine gas at a temperature ranging from 25° C. to 200° C.

3. The production method of tungsten hexafluoride according to claim 1, wherein the fluorine-containing gas used in the second step is a fluorine gas, a nitrogen trifluoride gas, or a mixed gas thereof.

4. The production method of tungsten hexafluoride according to claim 1, wherein, in the second step, the second amount of tungsten from which the oxide film has been removed is brought into contact with the fluorine-containing gas at a temperature ranging from 25° C. to 200° C.

5. The production method of tungsten hexafluoride according to claim 2, wherein, in the first step, the first amount of tungsten having the oxide film is brought into contact with the hydrogen fluoride-containing fluorine gas at a temperature ranging from 40° C. to 150° C.

6. The production method of tungsten hexafluoride according to claim 1, wherein the concentration of the hydrogen fluoride in the hydrogen fluoride-containing fluorine gas is from 100 vol ppm to 1 vol %.

7. The production method of tungsten hexafluoride according to claim 4, wherein, in the second step, the second amount of tungsten from which the oxide film has been removed is brought into contact with the fluorine-containing gas at a temperature ranging from 40° C. to 150° C.

8. The production method of tungsten hexafluoride according to claim 1,
   wherein the first step and the second step are performed in the same reactor,
   wherein the first step comprises charging the reactor with the raw material tungsten having the oxide film and the hydrogen fluoride-containing fluorine gas and closing the reactor, or comprises charging the raw material tungsten having the oxide film in the reactor and circulating the hydrogen fluoride-containing fluorine gas through the reactor, and wherein the second step comprises feeding the fluorine-containing gas into the reactor to allow the fluorine-containing gas to come into contact with the tungsten from which the oxide film has been removed, and then collecting the gas after the feeding.

9. A production method of tungsten hexafluoride, comprising:

a first step of bringing tungsten having an oxide film into contact with a hydrogen fluoride-containing inert gas in a reactor, thereby removing the oxide film from the tungsten, wherein the hydrogen fluoride-containing inert gas is an inert gas containing from 50 vol ppm to 50 vol % of hydrogen fluoride; and a second step of bringing the tungsten from which the oxide film has been removed by the first step into contact with a fluorine-containing gas to form tungsten hexafluoride.

10. The production method of tungsten hexafluoride according to claim 9, wherein, in the first step, the tungsten having the oxide film is brought into contact with the hydrogen fluoride-containing inert gas at a temperature ranging from 25° C. to 200° C.

11. The production method of tungsten hexafluoride according to claim 9, wherein the fluorine-containing gas used in the second step is a fluorine gas, a nitrogen trifluoride gas, or a mixed gas thereof.

12. The production method of tungsten hexafluoride according to claim 9, wherein, in the second step, the tungsten from which the oxide film has been removed is brought into contact with the fluorine-containing gas at a temperature ranging from 25° C. to 200° C.

13. The production method of tungsten hexafluoride according to claim 9, wherein, in the first step, the tungsten having the oxide film is brought into contact with the hydrogen fluoride-containing inert gas at a temperature ranging from 40° C. to 150° C.

14. The production method of tungsten hexafluoride according to claim 9, wherein the concentration of the hydrogen fluoride in the hydrogen fluoride-containing inert gas is from 100 vol ppm to 1 vol %.

15. The production method of tungsten hexafluoride according to claim 12, wherein, in the second step, the tungsten from which the oxide film has been removed is brought into contact with the fluorine-containing gas at a temperature ranging from 40° C. to 150° C.

16. The production method of tungsten hexafluoride according to claim 9, wherein the first step and the second step are performed in the same reactor, wherein the first step comprises charging the reactor with the raw material tungsten having the oxide film and the hydrogen fluoride-containing inert gas and closing the reactor, or comprises charging the raw material tungsten having the oxide film in the reactor and circulating the hydrogen fluoride-containing inert gas through the reactor, and wherein the second step comprises feeding the fluorine-containing gas into the reactor to allow the fluorine-containing gas to come into contact with the tungsten from which the oxide film has been removed, and then, collecting the gas after the feeding.

17. An oxide film removing method for tungsten, comprising bringing tungsten having an oxide film into contact with a hydrogen fluoride-containing gas, wherein the hydrogen fluoride-containing gas is either a fluorine gas containing from 50 vol ppm to 50 vol % of hydrogen fluoride or an inert gas containing from 50 vol ppm to 50 vol % of hydrogen fluoride.

18. The oxide film removing method for tungsten according to claim 17, wherein the tungsten having the oxide film is brought into contact with the hydrogen fluoride-containing gas at a temperature ranging from 25° C. to 200° C.

19. The oxide film removing method for tungsten according to claim 17, wherein the tungsten having the oxide film is brought into contact with the hydrogen fluoride-containing gas at a temperature ranging from 40° C. to 150° C.

20. The oxide film removing method for tungsten according to claim 17, wherein the concentration of the hydrogen fluoride in the hydrogen fluoride-containing gas is from 100 vol ppm to 1 vol %.

* * * * *